No. 733,631. PATENTED JULY 14, 1903.
T. E. DEVONSHIRE.
CONDUIT AND TROUGH FOR ELECTRIC CONDUCTORS.
APPLICATION FILED MAR. 3, 1903.
NO MODEL. 4 SHEETS—SHEET 1.
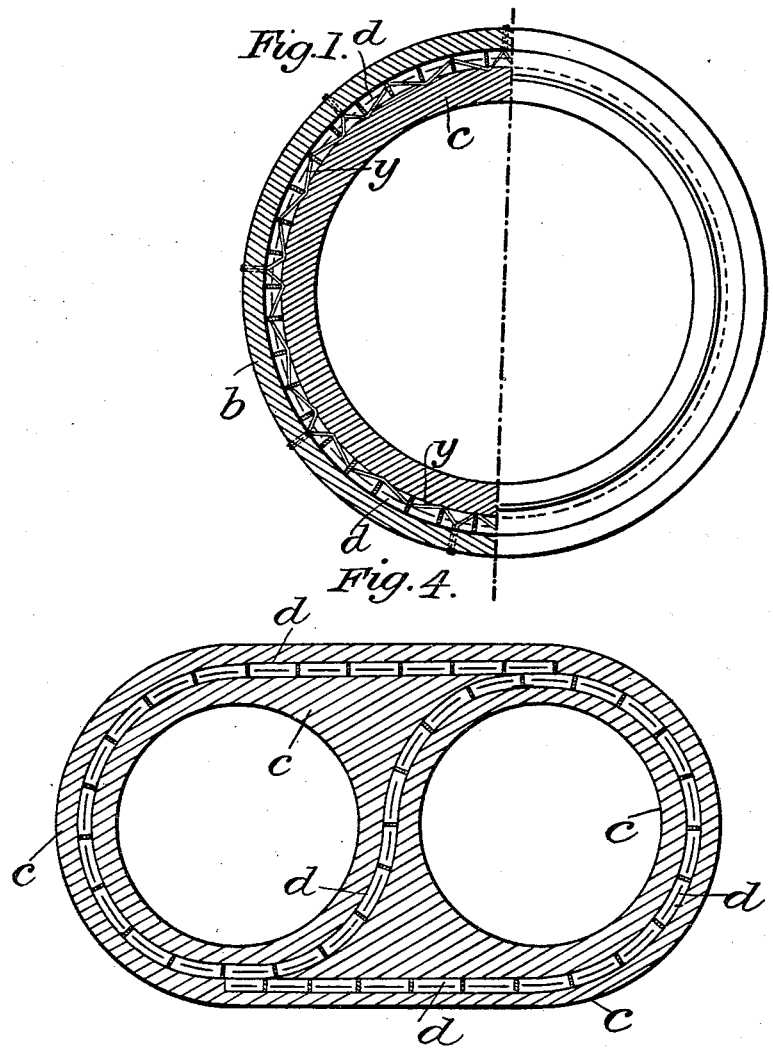
WITNESSES:
F. W. Wright
E. W. Collins
INVENTOR
Thomas Easton Devonshire
BY
Howson and Howson
HIS ATTORNEYS.

No. 733,631. PATENTED JULY 14, 1903.
T. E. DEVONSHIRE.
CONDUIT AND TROUGH FOR ELECTRIC CONDUCTORS.
APPLICATION FILED MAR. 3, 1903.
NO MODEL. 4 SHEETS—SHEET 2.
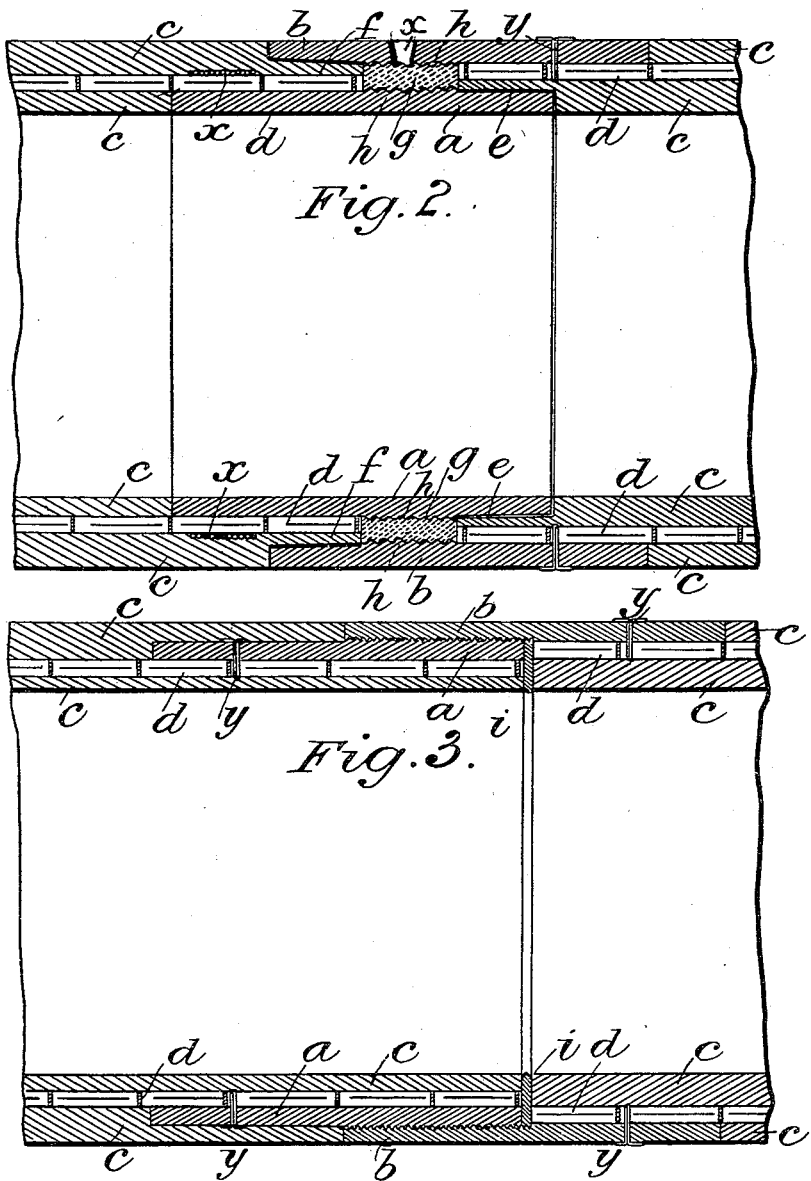

No. 733,631. PATENTED JULY 14, 1903.
T. E. DEVONSHIRE.
CONDUIT AND TROUGH FOR ELECTRIC CONDUCTORS.
APPLICATION FILED MAR. 3, 1903.
NO MODEL. 4 SHEETS—SHEET 3.
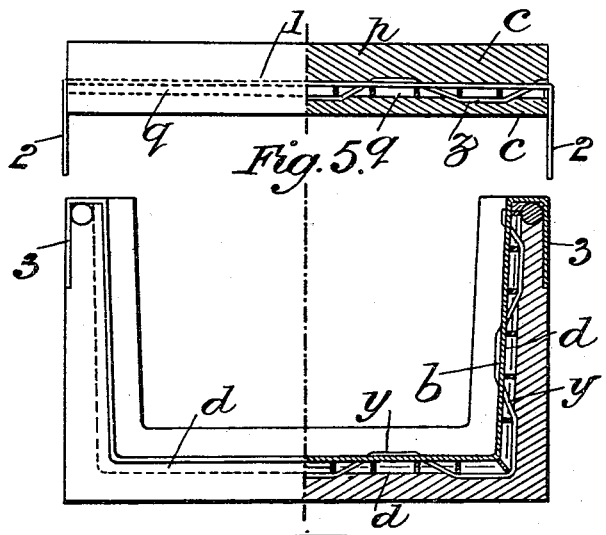
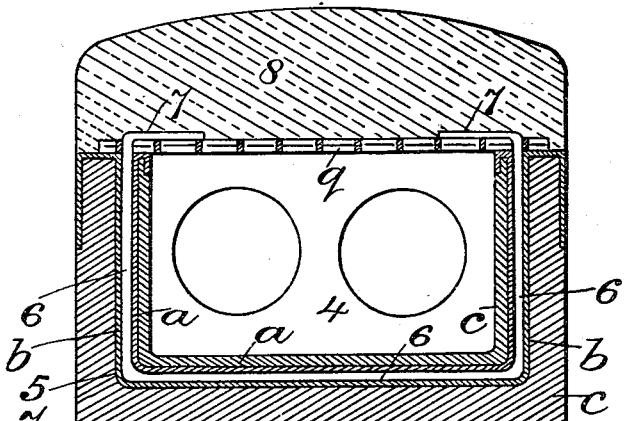
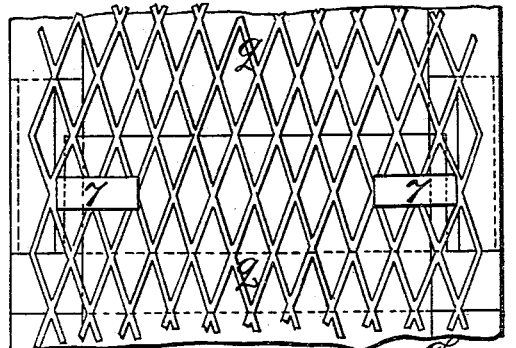
WITNESSES:
F. W. Wright.
E. W. Collins.
INVENTOR
Thomas Easton Devonshire
BY Howson and Howson
HIS ATTORNEYS.

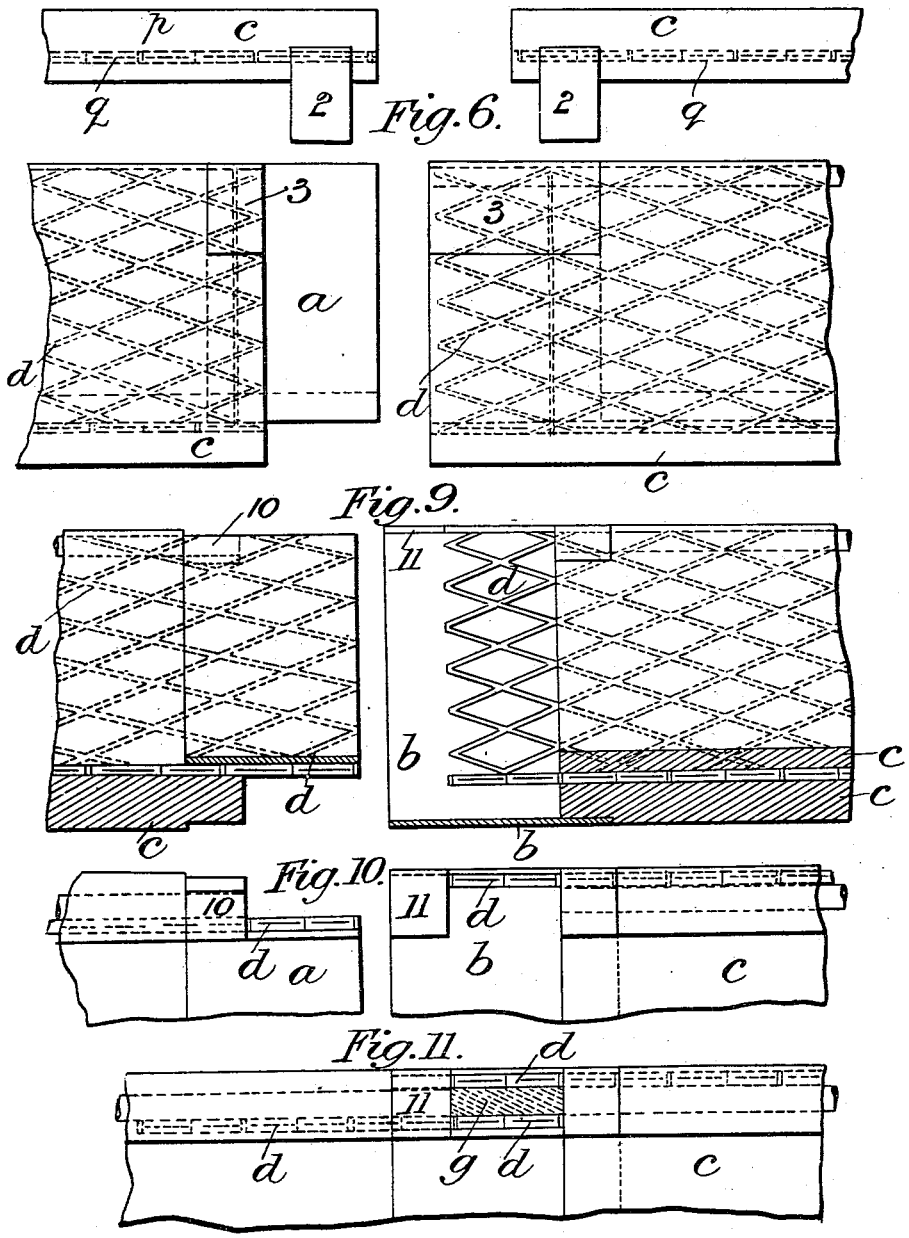

No. 733,631. Patented July 14, 1903.

UNITED STATES PATENT OFFICE.

THOMAS EASTON DEVONSHIRE, OF CHISLEHURST, ENGLAND.

CONDUIT AND TROUGH FOR ELECTRIC CONDUCTORS.

SPECIFICATION forming part of Letters Patent No. 733,631, dated July 14, 1903.

Application filed March 3, 1903. Serial No. 146,008. (No model.)

*To all whom it may concern:*

Be it known that I, THOMAS EASTON DEVONSHIRE, a subject of the King of Great Britain and Ireland, residing at Perbright, Chislehurst, in the county of Kent, England, have invented certain new and useful Improvements in Conduits and Troughs for Electric Conductors, of which the following is a specification.

My invention relates to conduits and troughs for electric conductors, the said conduits and troughs consisting of cement mortar, concrete, or the like, in combination with a core or armoring of metal network or "expanded metal;" and my invention has for its object to provide what is known as an "earth sheath" by the manner in which according to my invention such conduits and troughs are constructed. I attach the core or armoring of the body part of each length of conduit or trough at its ends to metal end pieces in such manner that there is good metallic contact between the core or armoring and the end pieces, and I also so connect the respective end pieces of adjacent lengths metallically together that when the conduit or trough is laid there is a continuity of metal throughout, so that a current of electricity entering any portion of the metal armoring or end pieces will be conveyed through the metallic structure without interference by any nonconducting material, and the conductor or conductors in the conduit or trough is or are protected from extraneous electric currents commonly called "electrolytic" currents.

I will describe my invention with reference to the accompanying drawings.

Figure 1 is an end view, partly in section, of the socket end of a conduit in the form of a pipe; and Fig. 2 is a longitudinal section of the said socket end jointed to the spigot end of the next length of conduit. Fig. 3 is a longitudinal section of a modification, and Fig. 4 is a transverse section of a conduit with two ducts or passages through it. Figs. 5 to 11 represent my invention as applied to U or equivalently shaped conduits, Fig. 5 being an end view of a length of trough and cover, (shown partly in section,) and Fig. 6 showing the adjacent ends of two such lengths. Figs. 7 and 8 are respectively a transverse section of a length and a plan of adjacent ends engaged, illustrating a modified construction; and Fig. 9 shows longitudinal sections, and Figs. 10 and 11 partial plans of adjacent ends, illustrating a further modification, Fig. 9 showing the ends disengaged and Fig. 10 showing them engaged and with the joint made between them.

Referring first to Figs. 1 and 2, I bend or roll a sheet of metal network or expanded metal $d$ on itself into a cylinder to form a core for the body part, and I may bind it with wire, as shown at $x$, the said network or expanded metal being overlapped where the sides join, and the overlapped portions being secured together by wire or by other suitable means, so that good electrical contact is obtained between the meeting parts of the said metal network or expanded metal, which parts should be thoroughly cleaned to insure such contact. One end of the cylindrical metal core thus formed is inserted into a metal socket-ring $b$, which the end of the said core penetrates to a sufficient depth to allow of the metal network or expanded metal being metallically connected to the said socket-ring, this attachment being done by wiring or riveting or otherwise securing the metal network or expanded metal to the said socket-ring, in which holes are made for the purpose. In the drawings this attachment is shown as being effected by wire $y$. The outer end of the metal core $d$ is attached in a similar way to a metal spigot-ring $a$ of a diameter smaller than the socket-ring $b$ at the other end. The metal core $d$ and the socket and spigot rings $b$ and $a$ thus connected are placed in a mold into which cement mortar, concrete, or the like is introduced, so as to form a length of conduit. The outer part and the internal part or core of the mold are made so that the cement mortar, concrete, or the like stops short of the ends of the metal rings $a$ and $b$. In the drawings I have marked the cement mortar, concrete, or the like with the letter $c$. To form a joint between the socket and spigot rings $b$ and $a$ of adjacent lengths of conduit, the spigot end of one length enters the socket end of the adjacent length, as shown in Fig. 2, and its extreme end is accommodated in a recess $e$, molded in the cement mortar, concrete, or the like which lines the back of the socket-ring $b$. The outer edge of the said socket-ring slips over an annular projection $f$ formed in the cement mortar, concrete, or the like which surrounds the spigot-ring $a$. When the ends of adjacent lengths of conduit are socketed together, an annular space is left between part of the inner face of the metal socket-ring $b$ and the opposite part of the outer face of the metal spigot-ring $a$, the respective diameters of the said socket and spigot-rings being such that this space is large enough to permit of lead or other suitable metal or alloy, (I will refer to it as "lead",) being run into it to form a joint, as shown at $g$. To introduce the lead, a hole $x$ (shown in Fig. 2) is left in the metal socket-ring $b$, this hole being brought uppermost when the lengths of conduit are laid. For further fixing the socket and spigot together the adjacent faces of the socket and spigot-rings may be corrugated or grooved, as shown at $h$, so as to firmly hold the lead.

According to the modification shown in Fig. 3 the diameters of the socket and spigot rings $b$ and $a$ are such that the spigot-ring $a$ fits the socket-ring $b$ closely without an intermediate annular space. In this case the joint may be turned and bored to give close contact or the socket and spigot may be tapped and screwed, so that successive lengths of conduit can be screwed together, as illustrated. $i$ is a ring of filling material between the abutting ends. When lead is run into the joints, as in Figs. 1 and 2, or when the sockets and spigots are fitted or screwed together, as in Fig. 3, a succession of lengths of conduit laid together form a conduit in which the metal parts are in such intimate metallic connection as to constitute a metallic earth sheath, capable of conveying and intercepting extraneous electric currents as aforesaid, this metallic earth sheath being itself surrounded or in main part surrounded by an insulating material constituted by the cement mortar, concrete, or the like, which preserves it from rusting.

In constructing conduits having two or more ducts or passages through them the metal network or expanded metal $d$, forming the core of the body part, can be bent over or curved into a shape somewhat resembling in transverse section the letter S or the figure 8, as shown in Fig. 4, so as to surround the tubular passages of the conduit, and the extremities of the metal core $d$ are attached, as described with regard to Figs. 1 and 2, to metal end pieces, which form, respectively, a socket and a spigot of rectangular, oval, circular, or other form, according to the number and grouping of the ducts or passages. Each duct or passage may terminate at one end in a projection and at the other end in a recess in such a manner that a socket and spigot joint is formed between the end of the individual adjacent ducts or passages when successive lengths of conduit are placed together, these sockets and spigots serving to insure the perfect alinement of the said ducts or passages throughout the length of the conduit. The joining together of adjacent lengths of conduit may be effected in a manner similar to that hereinbefore described, the socket end piece of each length of conduit being formed of a metal end piece of a shape corresponding to or sufficiently approximating the shape of the outside of the conduit and having the metal network or expanded metal core $d$ of the body part wired or otherwise attached to it, the corresponding spigot end piece of each length of conduit being also made of metal and being of such size that a sufficient peripheral space is left between the metal sockets and spigots (when adjacent lengths of conduit are put together) to allow of running in lead, as hereinbefore explained with reference to Figs. 1 and 2, so that in these conduits also the metal core $d$ of the body part of each length is in metallic contact with the metal end pieces, and successive lengths are brought into metallic contact by means of the lead joint, so as to insure a continuous earth sheath throughout the length of the conduit when laid.

Referring now to Figs. 5 and 6, which represent the invention applied to a U-shaped trough, the metal network or expanded metal $d$, which forms the core of the body part of the troughing, is brought into metallic contact with the metal end pieces $a$ $b$ by being connected with the said metallic ends by metal wire or strip $y$, which is passed through openings in the metal end pieces $a$ $b$ and interlaced with the expanded metal $d$, as described with regard to the previous modifications as applied to pipe-conduits. The end pieces $a$ and $b$ are so arranged that the metal piece $a$ at the spigot end is outside the concrete, so as to make electrical connection with the metal end piece $b$ of the adjacent socket, which is arranged within the concrete, so that electric currents intercepted by the metal of the troughing when laid will be conveyed throughout its length. In connection with this form of the troughing and to further protect from electric currents the conductor or conductors laid in it the slabs $p$, forming the cover of the troughing, may have their cores $q$ of metal network or expanded metal connected by wires or strips $z$ with transverse pieces of metal 1 with depending ends 2, which make contact (when the slabs are in position) with the end pieces $a$ and $b$ of the troughing, which for this purpose are provided with extensions 3 on the outside of the concrete.

In the modification illustrated in Figs. 7 and 8 the separate slabs forming the cover of the troughing are dispensed with, and when the troughing is laid and filled in with a filling 4 (such as bitumen or pitch) strips or sheets of metal network or expanded metal $q$ are laid over the filling and metallically connected to each other and at the joints of the troughing to the metallic core $d$ of the body of the troughing in such a manner that when laid in the troughing the conductor is or conductors are completely surrounded by metal, forming an uninterrupted earth sheath for the purpose aforesaid. To insure good metallic contact between adjacent lengths of the troughing and between the metallic cores of the lengths and of the covers, I leave a space 5 between the metal end pieces $a$ and $b$ of the spigot and socket, and I insert a metallic wire or strip 6 between the metal end pieces $a$ and $b$, the upper ends of this wire or strip being bent over at 7 or otherwise fastened to the metal network or expanded metal $q$. When the sheets of metal network or expanded metal have been secured to the troughing, as described, a layer 8, of cement mortar, concrete, bitumen, pitch, or the like, is applied to the said metal network or expanded metal $q$, so as to effectually insulate it from the surrounding earth and form a solid covering for the troughing.

In the modification illustrated in Figs. 9, 10, and 11 the metallic ends of the spigot $a$ and socket $b$ are connected with the metal network or expanded metal $d$, so that the metal end piece of the spigot $a$ is inside the said network or expanded metal, the said network or expanded metal being bent outward toward the other end of the length of trough, so as to be on the inside of the metal end piece $b$ of the socket. By this means a space is left between the adjacent ends of the metal network or expanded metal, into which space lead or other suitable metal or alloy $g$, Fig. 11, is run, so as to form a joint between the metal of the adjacent lengths and maintain electrical connection throughout for the purpose aforesaid. The metal end pieces $a$ and $b$ are also provided with bent-over pieces 10 and 11, respectively, which make contact with each other when the spigot is within the socket.

I claim as my invention—

1. Lengths of conduit for electric conductors, and formed of metal in combination with cement, a core of metal network having secured to its respective ends, metal spigot and socket end pieces joined to said core by a metallic connection, portions of the metal faces of the adjacent end pieces opposite each other exposed, a space between said exposed faces, and conductive material between said faces, means being provided for introducing it when the lengths are fitted together, substantially as described.

2. Lengths of conduit consisting of a U-shaped body part, of cement, in combination with metal, spigot and socket end piece and a core of metal network metallically connected together, and metal for the covers, and means for making metallic contact between the metal of the covers and the metal of the conduit, and between the engaged metal end pieces when the lengths are laid, substantially as hereinbefore described.

In testimony whereof I affix my signature in presence of two witnesses.

THOMAS EASTON DEVONSHIRE.

Witnesses:
WILLIAM JOHN WEEKS,
HENRY DENIS HOSKINS.